NONREDUNDANT ERROR DETECTION AND CORRECTION SYSTEM
Filed May 10, 1968 5 Sheets-Sheet 1
FIG. 1
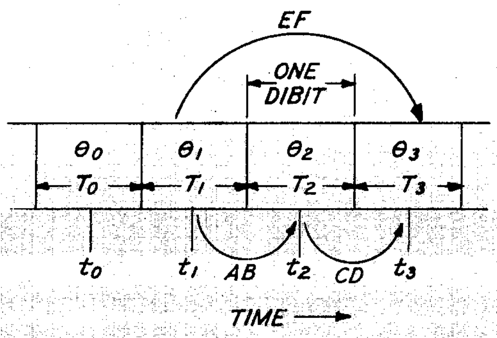
FIG. 2
ADJACENT DIBITS
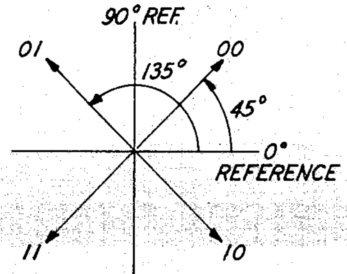
FIG 4
VALIDITY CHART
| CD \ AB, EF | 00 (+45°) | 01 (+135°) | 10 (-45°) | 11 (-135°) |
|---|---|---|---|---|
| 00 (+45°) | 10 (+90°) | 00 (±180°) | 11 (0°) | 01 (-90°) |
| 01 (+135°) | 00 (±180°) | 01 (-90°) | 10 (+90°) | 11 (0°) |
| 10 (-45°) | 11 (0°) | 10 (+90°) | 01 (-90°) | 00 (±180°) |
| 11 (-135°) | 01 (-90°) | 11 (0°) | 00 (±180°) | 10 (+90°) |
| | T1 | T2 | T3 | T4 |
FIG. 3
ALTERNATE DIBITS
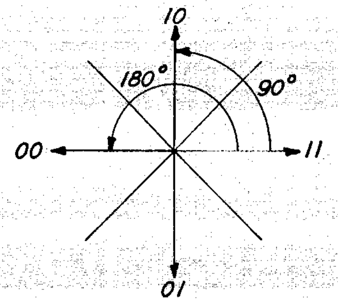
FIG. 8
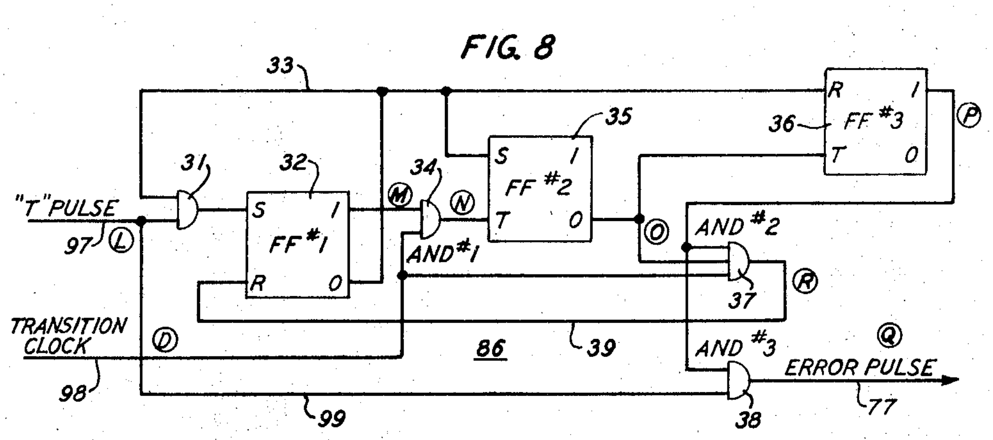
INVENTORS H.C. SCHROEDER
J. R. SHEEHAN
BY J. P. Kearns
ATTORNEY

NONREDUNDANT ERROR DETECTION AND CORRECTION SYSTEM

Filed May 10, 1968

3,529,290
Patented Sept. 15, 1970

3,529,290

NONREDUNDANT ERROR DETECTION AND CORRECTION SYSTEM

Henry C. Schroeder, East Brunswick, and John R. Sheehan, Red Bank, N.J., assignors to Bell Telephone Laboratories, Incorporated, Murray Hill and Berkeley Heights, N.J., a corporation of New York Filed May 10, 1968, Ser. No. 728,156
Int. Cl. G08c *25/00;* H04l *1/10*
U.S. Cl. 340—146.1 9 Claims

ABSTRACT OF THE DISCLOSURE

A nonredundant error detection and correction technique for differentially encoded phase-modulation data transmission systems in which errors are detected by comparing phases determined from successive pairs of adjacent signals with phases determined from corresponding alternate pairs of nonadjacent signals. Failure of such comparison to be consistent determines the presence of error. Logical determination of the adjacent phase difference that validates the comparison corrects the error. All phase differences are digitally encoded to facilitate the implementation of the technique.

BACKGROUND OF THE INVENTION

Field of the invention

This invention relates generally to error detection and correction apparatus for digital data transmission systems and particularly to nonredundant real-time error detection and correction in differentially encoded phase-modulation data transmission systems.

Description of the prior art

Prior art error detection and correction techniques for digital data transmission rely for the most part on the parity principle. According to this principle digital data to be transmitted are grouped into blocks of fixed length and one or more parity check digits are computed to make the number of bits of one or the other type even. By multiple computation of parity digits from each block of data and interlacing of these parity digits with the message digits a basis can be established for correcting, as well as detecting, most errors that may occur in transmission through a distorting medium. Received data blocks are checked for a predetermined correspondence between message and parity digits. Failure of correspondence detects the presence of errors and, depending on the complexity of the parity code, one or more errors can be corrected.

There are certain inherent disadvantages of the parity check technique. Parity encoding equipment is required at the transmitter to generate the parity digits. Parity decoding equipment is required at the receiver to interpret the received data and to delete the parity digits. Furthermore, the redundancy of the parity digits reduces the transmission efficiency of the overall system by the ratio of the number of parity digits generated to the length of the transmitted block.

In Pat. 3,128,342 and 3,128,343 granted to P. A. Baker on Apr. 7, 1964 a digital data transmission system employing phase modulation with differential encoding is disclosed. In that system a serial binary data train consisting of "1" and "0" data bits is converted into pairs of bits called dibits (pronounced "dye-bits"). Each of the four possibile dibits; namely, 00, 01, 10 and 11, is assigned an incremental phase shift in odd multiples of 45°. For example, the dibits 00 and 10 may be assigned respective +45° and −45° phase shifts and the dibits 01 and 11, +135° and −135° phase shifts. These four phase shifts are applied to a carrier wave of fixed frequency in accordance with the data to be transmitted. The absolute phase of the carrier for a particular dibit is shifted by the appropriate increment with respect to the absolute phase transmitted for the previous dibit. Thus, each dibit is encoded by the difference in phase existing between successive signaling intervals, i.e., the dibits are differentially encoded. No fixed phase reference is required at the receiver.

Certain properties inherent in differentially encoded phase modulated data transmission can be turned to account for error detection and correction purposes.

It is accordingly an object of this invention to detect and correct errors in a digital data transmission system nonredundantly.

It is another object of this invention to detect and correct errors in a differentially encoded phase-modulation data transmission system without altering the transmitted signal in any way.

It is yet another object of this invention to detect and correct errors in a phase-modulation data transmission system in real time without introducing redundancy into the transmitted signal.

It is a further object of this invention to detect and correct errors in a phase-modulation data transmission system by means of auxiliary apparatus at the receiver location only and without changing the operation of an existing receiver.

SUMMARY OF THE INVENTION

According to this invention, single errors caused by the transmission of differentially encoded phase-shift data over a distorting transmission medium are detected and corrected by taking advantage of properties inherent in such a signal. Inasmuch as each transmitted dibit is encoded as the difference in phase between successive signaling intervals, the difference in phase between alternate signaling intervals must be equal to the algebraic sum of the differences in phase between two successive adjacent signaling intervals if no error has occurred. Phase-modulation data receivers constructed according to the teachings of the Bakers patents continuously determine the difference in phase between adjacent signaling intervals by intermodulating the present received phase with the preceding received phase, which has been delayed by exactly one signaling interval. According to this invention, each received phase is delayed by a further signaling interval and again intermodulated with the present received phase to determine the difference in phase between alternate signaling intervals. Errors are detected by continuously comparing the sum of the detected differences in phase for each pair of successive adjacent signaling intervals with the detected difference in phase between alternate signaling intervals. Failure of the comparison for two successive signaling intervals indicates an error in the first of these intervals. Errors are corrected by subtracting the adjacent phase difference obtained in the second of the two signaling intervals in which the comparison fails from the alternate phase difference obtained at the same time. The phase resulting from this subtraction corresponds to the phase which would have been obtained in the first of the two pertinent signaling intervals if no error had occurred. From this corrected phase the correct dibit pair is generated and introduced into the demodulated data stream.

Implementation of this technique of error detection and correction is facilitated by digitalizing the several demodulated phases in binary form. Adjacent phases are demodulated exactly as in the Baker receiver. Each prior adjacent phase is made available to the error detector along with the present adjacent phase by delaying the digital representation of each such phase by an additional signaling interval. This is equivalent to demodulating alternate phases, i.e., demodulating over two signaling intervals. The serial data stream is obtained from the output of the Baker receiver in the manner therein taught. The serial data is further shifted through a multistage shift register before being applied to a data utilization circuit. The states of this shift register are changed in an appropriate manner by the error correction circuit whenever an error is corrected. The error correction circuit, however, is enabled only when two successive error indications are generated in the error detection circuit.

It is an important feature of this invention that the error detection and correction system is implemented as an applique unit to a standard phase-modulation data receiver. The only modification required of the existing receiver is to bring out certain connection points to the applique unit. No modifications are required in the transmitter and thus no alteration of the signaling format is necessitated.

DESCRIPTION OF THE DRAWING

The several features, objects and advantages of this invention will be more fully appreciated by a consideration of the following detailed description and the drawing in which:

FIG. 1 is a line signal timing diagram useful in the explanation of the principle of the invention;

FIGS. 2 and 3 are vector diagrams showing the digital phase-encoding scheme for adjacent and alternate dibits, respectively;

FIG. 4 is a validity chart showing the relationships among valid adjacent and alternate phase dibit codes;

FIG. 8 is a logic diagram of a counter circuit useful in the practice of this invention.

DETAILED DESCRIPTION

Principle of the invention

Figure 5:
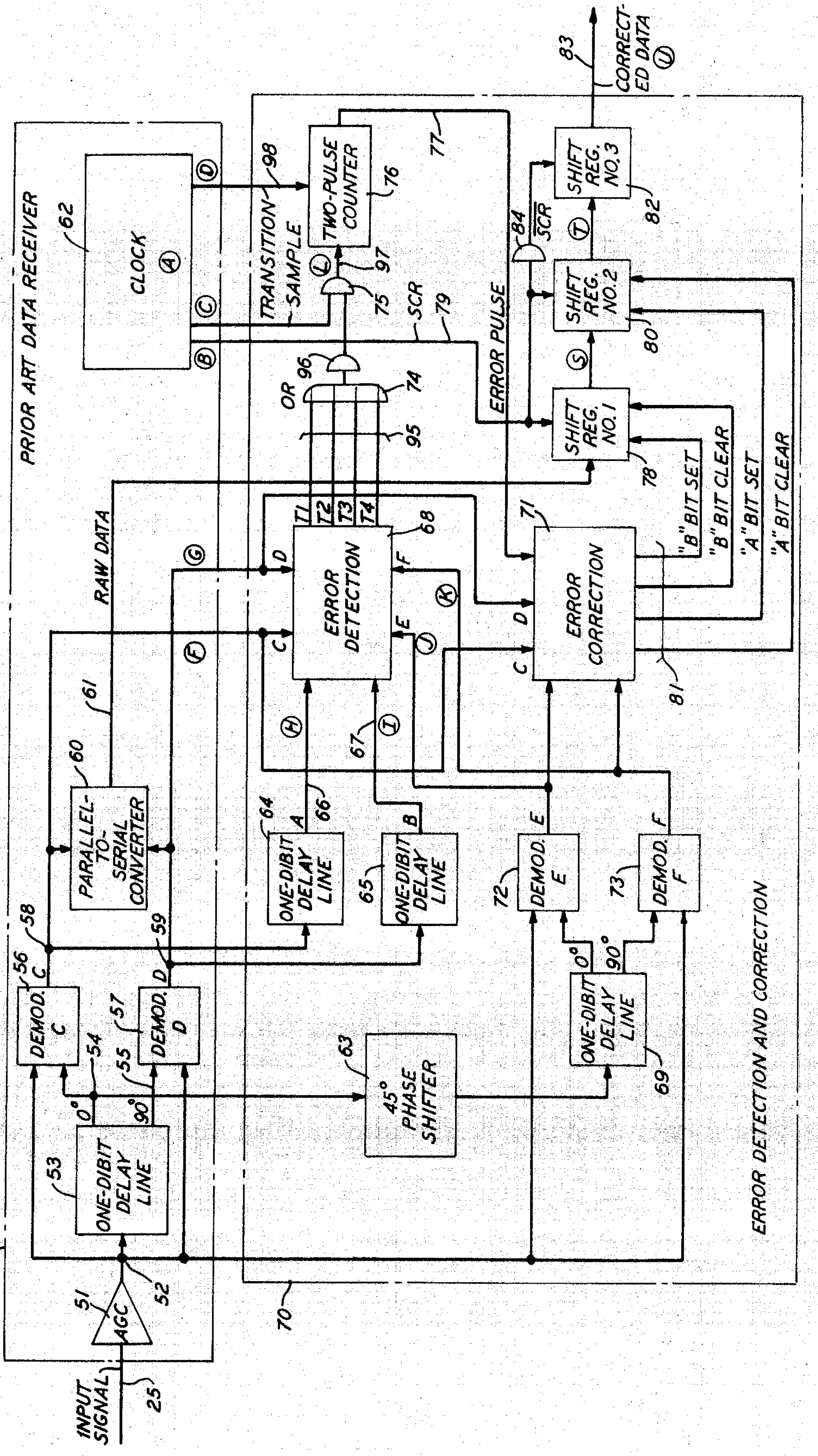
FIG. 5 is a block schematic diagram of an illustrative embodiment of the error detection and correction system of this invention as applied to a phase-modulation receiver of the Baker type.

Reference is made to P. A. Baker Pat. 3,128,342 for details of the differential encoding of serial binary data in dibit pairs on a carrier wave of fixed frequency. Briefly, serial data bits are paired into dibits and through appropriate logic circuitry, the phase of the carrier wave is shifted with reference to the existing phase by an odd multiple of 45 electrical degrees according to the scheme shown in FIG. 2. The existing phase is the reference phase shown in FIG. 2. Dibits 00 and 10 generate respective positive and negative 45° phase shifts. Dibits 01 and 11 similarly generate respective positive and negative 135° phase shifts. Thus, a phase shift occurs for every dibit to supply a discrete transition for the line signal to aid in timing recovery at the receiver. No special reference phase information need be transmitted since each signaling interval supplies its own reference for the one following.

At the receiver, as described in more detail in Baker Pat. No. 3,128,343, each discrete received phase is delayed by one dibit signaling interval and intermodulated with the phase of the next following signaling interval to demodulate the appropriate dibit. By parallel-to-serial conversion the serial data stream is reconstructed. Due to the differential encoding errors are not cumulative. No error occurs as long as the perturbation of a single transmitted phase is less than 45°. However, two successive absolute phases, each perturbed by less than 45°, can combine algebraically in the demodulation process to produce a differential error exceeding 45° and a resultant single incorrectly demodulated dibit. Gaussian noise is the usual cause of this type of error. According to this invention single errors due to such Gaussian noise perturbation are detected and corrected by forcing such errors to manifest themselves in two successive signaling intervals. Impulse noise, as well as Gaussian noise on occasion, can also perturb the transmitted phase by more than 45°. In this case double errors result. Double errors are not corrected by the illustrative embodiment of this invention, although its principles can be extended to detect and correct such double errors.

FIG. 1 is a line signal timing diagram extending over four successive dibit signaling intervals. Times $t_0$ through $t_3$ indicate midpoints of successive dibit signaling intervals, and $T_0$ through $T_3$, the actual signaling intervals. During each signaling interval $T_0$, $T_1$, and so forth, the phase is constant. During interval $T_0$ absolute phase $\theta_0$ is transmitted; during interval $T_1$, absolute phase $\theta_1$ is transmitted, and so forth. The data receiver takes the difference between absolute phases in adjacent signaling intervals. Thus, the difference between phases $\theta_2$ and $\theta_1$ taken at sampling instant $t_2$ encodes dibit AB; and the difference between phases $\theta_3$ and $\theta_2$ at sampling instant $t_3$ encodes dibit CD. In the remaining discussion CD denotes the present received dibit pair, where C and D may represent the binary digits "1" or "0." AB denotes in a similar manner the next previous dibit. AB and CD are thus adjacent dibit pairs.

The error detection and correction technique of this invention depends on a comparison of the sum of two adjacent dibit demodulations with an alternate dibit demodulation bracketing the two adjacent dibits. Thus, the dibit EF in FIG. 1 represents the dibit demodulation obtained by subtracting from phase $\theta_3$ its alternate prior phase $\theta_1$ at sampling instant $t_3$. This subtraction of alternate phases does not take place in the existing data receiver. FIG. 3 shows the relationship between alternate phases and dibits. The phases are seen to be multiples of 90 electrical degrees. Positive and negative 90° phase differences are demodulated as the dibits 10 and 01, respectively. Similarly, opposite phase differences of 0° and 180° are demodulated as the dibits 11 and 00, respectively.

The principle of this invention is based on the observation that, in the absence of error, $$\theta_n-\theta_{n-2}=(\theta_n-\theta_{n-1})+(\theta_{n-1}-\theta_{n-2}) \qquad (1)$$

Assume for the sake of specific example that dibit AB is 00 and CD is 00, then $\theta_2-\theta_1=+45°$, $\theta_3-\theta_2=+45°$ and, in the absence of error, $\theta_3-\theta_1=+90°$, and dibit EF is 10. This is the situation where the received phase is substantially the same as the transmitted phase, i.e., within 45° of the transmitted phase.

Assume further that the received phase is perturbed by noise or other interference due perhaps to frequency translations in a carrier transmission system. Let $$\theta_n=S_n+N_n \qquad (2)$$

where $\theta_n$ is the received phase,
$S_n$ is the transmitted phase, and
$N_n$ is the phase perturbation due to passage through the transmission medium.

The decision criteria built into the data receiver are such that a phase difference falling in the first quadrant is interpreted as the dibit 00, in the second quadrant as the dibit 01, and so forth; as is shown in FIG. 2. Similarly, alternate dibit phase differences within 45° of the 0°, 90°, 180° and 270° vector positions are interpreted as shown in FIG. 3. Therefore, a phase difference more than 45° from the true position produces an error.

Let the serial data signal to be transmitted be a train of 0's. Thus, the transmitted absolute phases can be $S_0=0°$, $S_1=+45°$, $S_2=+90°$ and $S_3=+135°$. Further let phases $S_1$ and $S_2$ be perturbed by amounts $N_1=+30°$ and $N_2=-30°$. Then at time $t_2$ there will be available $$\theta_1-\theta_0=S_1+N_1-S_0=+75° \text{ (00, correct)} \quad (3)$$
$$\theta_2-\theta_1=S_2+N_2-S_1-N_1=-15° \text{ (10, error)} \quad (4)$$
$$\theta_2-\theta_0=S_2+N_2-S_0=60° \text{ (10, correct)} \quad (5)$$

The phase difference obtained in Equation 3 is other than 45° (the correct value), but the value (75°) obtained lies in the first quadrant of FIG. 2 and is correctly demodulated as the dibit 00, as shown in parentheses. The total perturbation $N_2-N_1=-60°$ in Equation 4, however, exceeds 45° and therefore the value (−15°) obtained is incorrectly demodulated as the dibit 10. Similarly, in Equation 5, the alternate dibit is correctly demodulated as 10. According to this invention, an error pulse is arranged to be generated at time $t_2$.

At the next sampling instant $t_3$ there will be available $$\theta_2-\theta_1=S_2+N_2-S_1-N_1=-15° \text{ (10, error)} \quad (6)$$
$$\theta_3-\theta_2=S_3-S_2-N_2=+75° \text{ (00, correct)} \quad (7)$$
$$\theta_3-\theta_1=S_3-S_1-N_1=+60° \text{ (10, correct)} \quad (8)$$

Equation 6 is seen to be identical to Equation 4 and contains the same error. Equations 7 and 8 are correctly demodulated even though respective ±30° errors are present. According to this invention, another error pulse is arranged to be generated at time $t_3$. The occurrence of error pulses at two successive sampling instants $t_2$ and $t_3$ is employed to trigger the correction of the error existing at instant $t_2$ in accordance with Equation 1. In effect Equation 1 is solved for the second term $$(\theta_{n-1}-\theta_{n-2})$$

on the right-hand side. The correctly interpreted phase angles (within 45° of an allowable angle) corresponding to Equations 7 and 8 are substituted in Equation 1 to obtain the correct phase difference $$\theta_2-\theta_1=(\theta_3-\theta_1)-(\theta_3-\theta_2)=90°-45°=45°$$

The technique of this invention is facilitated by using demodulated dibits rather than actual angles. The validity chart of FIG. 4 forms the basis for digitalizing the technique. The adjacent dibit demodulated at the sampling time $t_2$ in which an error is first recognized is designated AB, the adjacent dibit demodulated at the sampling time $t_3$ in which an error again is recognized is designated CD and the alternate dibit demodulated at the sampling time $t_3$ is designated EF. The validity chart of FIG. 4 is accordingly constructed by inspection from FIGS. 2 and 3. Dibits AB with corresponding nominal phase differences indicated in parentheses head the columns; dibits CD, the rows; and dibits EF, the tabular entries. The designations T1, T2, T3 and T4 also designate the columns for the purpose of logic development.

The chart of FIG. 4 can be described in terms of Boolean algebra. For column T1 one may write $$T1=A'B'(C'D'EF'+C'DE'F'+CD'EF+CDE'F)$$
$$=A'B'[C'F'(D'E+DE')+CF(D'E+DE')]$$
$$=A'B'(CF+C'F')(DE'+D'E) \quad (9)$$

Similarly, $$T2=A'B(CE+C'E')(DF+D'F') \quad (10)$$
$$T3=AB'(CE'+C'E)(DF'+D'F) \quad (11)$$
$$T4=AB(CF'+C'F)(DE+D'E') \quad (12)$$

In Equations 9 through 12 the plus sign indicates the logical OR function and multiplying relationships indicate the logical AND function. The primes indicate inversions. Valid substitutions in these equations produce a logical "1" output for at least one of these equations at a given sampling instant. The occurrence of an error produces a logical "0" output for all four equations.

Logic Equations 9 through 12 can be implemented by standard circuitry as explained below in connection with FIG. 6.

It will be appreciated that for each EF entry in FIG. 4 there are four mathematical possibilities for a total of 64. However, only the sixteen shown are valid. The occurrence of any one of the other 48 possibilities indicates an error. The logical implementation of FIG. 4 provides a basis for error detection and for error correction as well.

By further inspection of the validity chart of FIG. 4 and application of Equation 1 thereto, logical equations for the restoration of the AB dibit can be developed. The A bit becomes a "1," if and only if columns 3 and 4 of the chart are satisfied. Thus, $$A_{set}=C'D'EF+C'DEF'+CD'E'F+CDE'F'+C'D'E'F$$
$$+C'DEF+CD'E'F'+CDEF'$$
$$=C'D'F(E+E')+C'DE(F+F')+CD'E'(F+F')$$
$$+CDF'(E+E')$$
$$=CDF'+CD'E'+C'DE+C'D'F \quad (13)$$

The parenthetical terms are unity by Boolean identity. In a similar manner equations can be developed for $A_{clear}$, $B_{set}$, and $B_{clear}$. Thus, $$A_{clear}=CDF+CD'E+C'DE'+C'D'F' \quad (14)$$
$$B_{set}=CDE+CD'F'+C'DF+C'D'E' \quad (15)$$
$$B_{clear}=CDE'+CD'F+C'DF'+C'D'E \quad (16)$$

Logic Equations 13 through 16 can be implemented by standard circuitry to obtain error correction control signals as explained below in connection with FIG. 7.

Overall error detection and correction system

FIG. 5 is a block diagram of the overall error detection and correction system of this invention as applied to a differentially encoded phase-modulation data transmission system. The complete system comprises a phase-modulation data receiver 50 of the type disclosed in Baker Pat. No. 3,128,343 in connection with FIG. 11 thereof and an error detection and correction system 70 according to this invention.

Data receiver 50 accepts a synchronous phase-modulation line signal in which the difference in phase between successive signaling intervals encodes a dibit pair of binary signals. The input signal on line 25 is amplified and normalized in automatic gain control circuit 51. The output of circuit 51 at point 52 is applied directly to demodulators 56 and 57, which are identical, and to analog delay line 53. Delay line 53 delays the normalized signal by one dibit or signaling interval (typically 1/1200 second). There are a 0° output and a 90° output for delay line 53 to provide 0° and 90° reference vectors shown in FIG. 2. It is readily apparent from the coding chosen that the first bit of the dibit pair can be demodulated with respect to the 0° horizontal reference axis, the first bit being 0 in the first and second quadrants, i.e., advanced in phase with respect to the 0° reference, and 1 in the third and fourth, i.e., retarded in phase with respect thereto. Likewise, the second bit of the dibit pair can be demodulated with respect to the 90° vertical reference axis, the second bit being 0 in the first and fourth quadrants and 1 in the second and third. Demodulator 56, having as inputs the absolute phase of the present received dibit and the 0° reference phase of the prior received dibit, produces at point 58 the C bit or first bit of the present dibit pair CD. Similarly, demodulator 57, having as inputs the absolute phase of the present received dibit and the 90° reference phase of the prior received dibit, produces at point 59 the D bit or second bit of the present dibit pair CD. Parallel-to-serial converter 60 transforms the simultaneously demodulated C and D bits into serial relationship in a straightforward manner and thus provides a raw uncorrected data stream on lead 61.

Data receiver 50 operates continuously on the incoming phase-shift signal as described more fully in Baker Pat. 3,128,343. Clock circuit 62 produces dibit and serial timing waves in accordance with the teachings of either of Pat. No. 3,020,479 or 3,209,265 issued respectively to M. A. Logan on Feb. 6, 1962 and to P. A. Baker and M. A. Logan on Sept. 28, 1965.

Applique error detection and correction circuit 70 is added to the known data receiver as shown in FIG. 5. Circuit 70 comprises 45° phase shifter 63 with input connected to 0° reference point 54 in receiver 50, one-dibit analog delay line 69 identical to delay line 53, demodulators 72 and 73, one-dibit digital delay units 64 and 65 connected respectively to demodulation points 58 and 59 in receiver 50, error detection unit 68, error correction unit 71, two-pulse counter 76, and shift register stages 78, 80 and 82 having as input the raw data on lead 61 from receiver 50.

Demodulators 72 and 73 have as inputs the present absolute received phase from point 52 at the output of agc circuit 51 and the respective 0° and 90° reference phases from the dibit transmitted two dibit signaling intervals previously. The reference inputs to demodulators 72 and 73 have experienced a delay of two signaling intervals by reason of having passed through delay line 53 in receiver 50 and delay line 69 in applique unit 70. Additionally, a 45° phase shift has been imparted in shifter 63 to implement the vector diagram of FIG. 3. Demodulators 72 and 73 generate respective first and second bits E and F of a dibit pair EF, which decodes a phase angle representative of the difference in phase between alternate dibit periods, i.e., between the phases existing at times $t_3$ and $t_1$ of FIG. 1, for example.

Delay units 64 and 65, which may be single shift register stages advanced by the dibit clock wave, store the individual bits of the previous dibit pair for one dibit signaling interval and make them available to error detection unit 68 on leads 66 and 67.

Error detection unit 68 has as inputs the respective demodulated bits of adjacent dibits AB and CD and of alternate dibit EF. Equations 9 through 12 are implemented therein as explained more fully hereinafter in connection with the description of FIG. 6. Its outputs appear on leads 95. These are combined in buffer OR-gate 74. A 1 output will occur on one of leads 95 whenever the comparison between adjacent and alternate dibits is valid, and a 0 output otherwise. Therefore, inverter 96 is provided in tandem with OR-gate 74 to produce a positive error indication.

As previously explained, each single error in the transmitted signal is made to manifest itself by an error indication in two adjacent signaling intervals. Therefore, two-pulse counter 76 is provided to produce an error control pulse on lead 77 whenever a double error indication occurs. An embodiment of a two-pulse counter useful in the practice of this invention is shown in FIG. 8.

Error correction unit 71 has as inputs respective demodulated bits of present dibit CD and alternate dibit EF and the error pulse signal on lead 77. It has as outputs on leads 81 correction signals for the bits of previous dibit AB. Error correction unit 71 implements Equations 13 through 16 as more fully explained below in connection with the description of FIG. 7.

The raw data output of receiver 50 is shifted at the serial clock rate SCR available on lead 79 through shift register stages 78 and 80. These stages respectively store the individual B and A bits of the previous dibit pair AB. In the absence of error their contents are shifted through a third shift-register stage 82 onto output line 83, which is connected to a data utilization circuit (not shown). Stage 82 is advanced by the SCR wave inverted in inverter 84, i.e., phase shifted by 180°. When an error has been detected and corrected, the correct bits are reconstructed by error correction unit 71 by way of set and clear input leads 81.

Error detection logic

Figure 6:
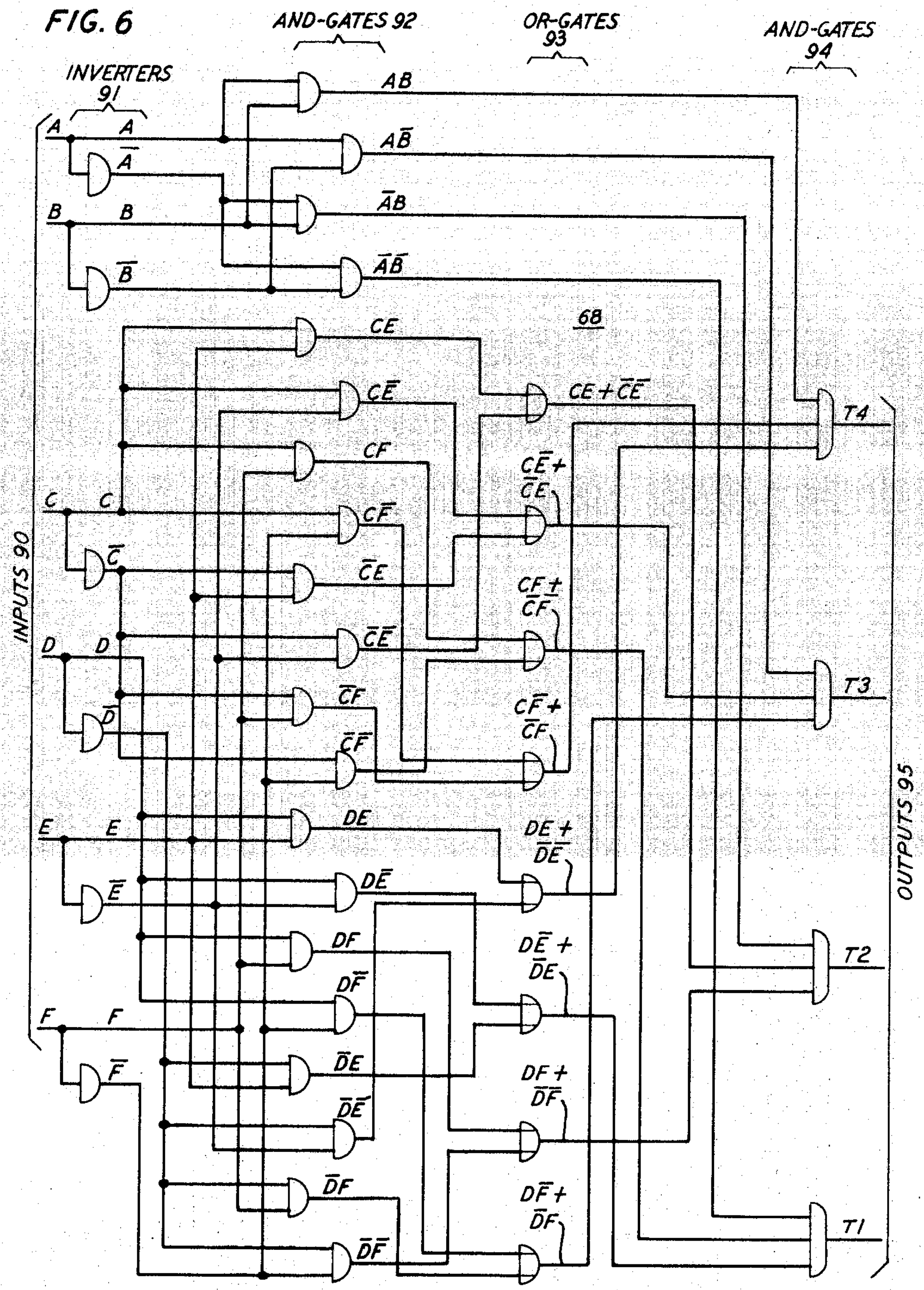
FIG. 6 is a logic diagram of the error detection apparatus of this invention.

Logic circuitry for implementing error detection unit 68, using conventional AND- and OR-gates, is shown in FIG. 6. At inputs 90 simultaneously available prior A, B bits from delay units 64 and 65, present C, D bits from receiver 50, and alternate E, F bits from demodulators 72 and 73 are applied. Each of these inputs is inverted in one of inverters 91 as shown. Thus, each input and its complement are available for application to AND-gates 92 to generate signals representative of the pairs required for implementation of the controlling equations. The respective signals so generated are indicated on the drawing. Appropriate pairs from AND-gates 92 are buffered in OR-gates 93 to produce the required combinations as indicated on the drawing. Output AND-gates 94 produce the control outputs T1 through T4 in accordance with Equations 9 through 12 on leads 95. For example, output T1 implements equation 9 by combining the output A'B' from one of AND-gates 92 (fourth from the top) with the outputs $(CF+C'F')$ and $(DE'+D'E)$ from two of OR-gates 93 in a straightforward manner. Lead T1 goes positive if the equation is solved and remains at ground otherwise. The other outputs are similarly related to the equations. A more detailed description is believed unnecessary. The controlling equations can be readily implemented also by so-called NAND logic, if more convenient.

Error correction logic

Figure 7:
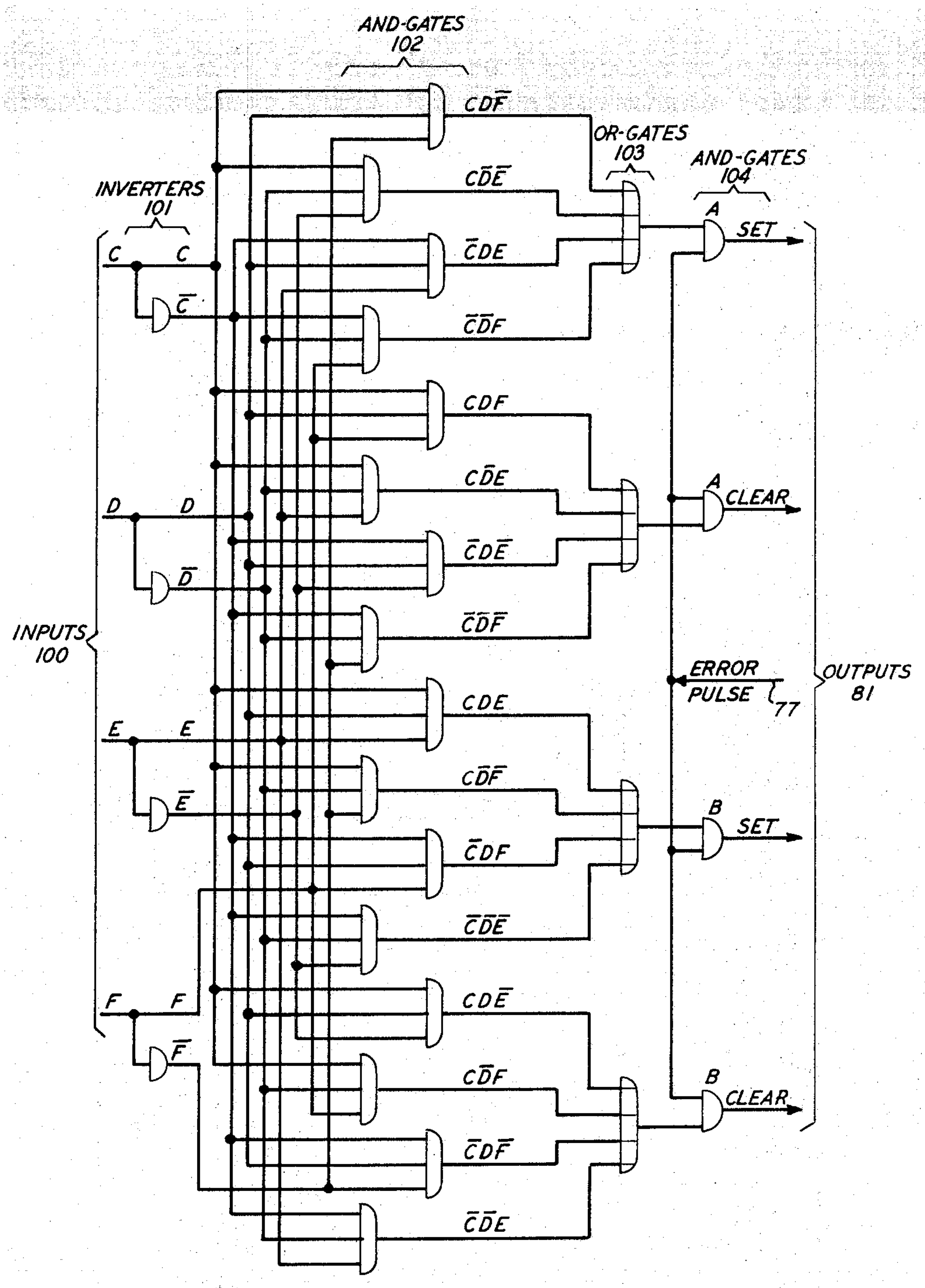
FIG. 7 is a logic diagram of the error correction apparatus of this invention.

Logic circuitry for implementing error correction unit 71, also using conventional AND- and OR-gates, is shown in FIG. 7. At inputs 100 simultaneously available present C, D bits from receiver 50 and alternate E, F bits from demodulators 72 and 73 are applied to the circuit. Each of these inputs is inverted in inverters 101 as shown. Thus, each input and its complement are available for application to AND-gates 102 to form signals representative of the triplets required for implementation of the controlling equations as shown in the drawing. Appropriate outputs from these AND-gates are buffered in OR-gates 103. Finally, the buffer signals are applied to output AND-gates 104, which are in turn enabled by the error pulse obtained on lead 77 from two-pulse counter 76. Signals presented on output leads 81 produce corrective signals for the previous dibit pair A, B in accordance with equations 13 through 16. The operation of the logic circuit of FIG. 7 would appear to be clear to one skilled in the art by inspection, and further detailed discussion is believed unnecessary. It need only be noted that for each error corrected the complete AB dibit is generated, i.e., one A-gate 104 and one B-gate 104 together yield significant 1 outputs.

Two-pulse counter

FIG. 8 illustrates an implementation of two-pulse counter 76 of FIG. 5 which is useful in the practice of this invention. Conventional coincidence or AND-gates and bistable flip-flops are employed as shown. The AND-gates produce 1 outputs when all its inputs are 1, and 0 outputs otherwise. The flip-flops have set, reset (clear) and toggle inputs. Only certain of these inputs are used in a give flip-flop. A 1 signal at a set (S) input produces a 1 output. A 1 signal at a reset (R) input produces a 0 output. A 1 signal at a toggle (T) input causes the existing outputs to change state. The overall circuit is intended to produce a 1 output after two T pulses have been applied on lead 97 from error detection unit 68. The circuit is timed from transition pulses occurring at the beginning of each dibit signaling interval.

A T pulse on lead 97 after sampling in AND-gate 75 (FIG. 5) is applied to input AND-gate 31 directly and to output AND-gate 38 by way of lead 99. AND-gate 31 is enabled when flip-flop 32 is in the normal reset condition over lead 33. AND-gate 38 is normally disabled. Therefore, the first T pulse produces a 1 output to set flip-flop 32, whereupon AND-gate 31 is immediately disabled. Flip-flop 32 changes to its 1 state as shown on line (M) of the waveform diagram in FIG. 9. On the next transition of the dibit clock on lead 98 (the transition waveform appears on line (D) of FIG. 9) AND-gate 34 produces a 1 output as shown on line (N). Flip-flop 35, which had been in its set condition, is now toggled to its reset state as shown on line (O) of FIG. 9 to enable AND-gate 37 and to toggle flip-flop 36, which had been in its normal reset state, to the set state. The output of flip-flop 36 is shown on line (P) of FIG. 9. AND-gate 37 is now fully enabled and on the occurrence of the next transition clock pulse on lead 98 a reset pulse for flip-flop 32 is generated as shown on line (R) of FIG. 9. The resetting of flip-flop 32 generates a 1 signal on lead 33 which again enables input gate 31 and restores flip-flops 35 and 36 to their normal set and reset states. The output of flip-flop 36 has enabled output gate 38 for one dibit signaling interval to provide a window for the second T pulse. If a second T pulse occurs, it is directed by way of lead 99 to output AND-gate 38 and generates an error pulse on lead 77 for application to error correction unit 71. Input AND-gate 31 has been disabled by the 0 output of flip-flop 32 during the window interval.

Operation of error detection and correction circuit

Figure 9:
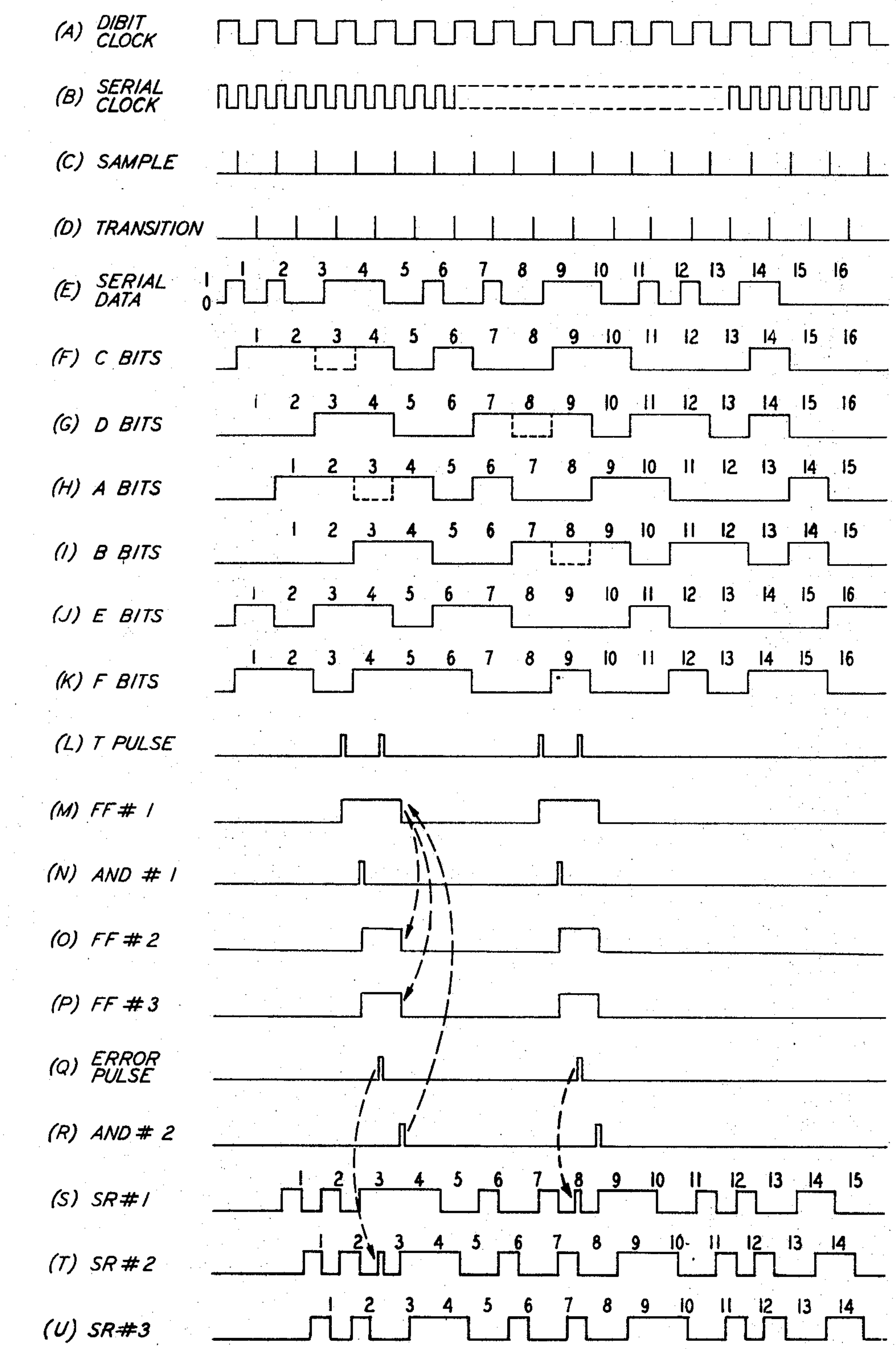
FIG. 9 is a waveform diagram showing the operation of the error detection and correction apparatus of this invention on a representative serial data stream in which two errors occur.

The operation of the complete circuit of FIG. 5 can best be described in the context of the transmission of a representative data signal, such as is shown on line (E) of FIG. 9. FIG. 5 is keyed to FIG. 9 by encircled capital letters. Clock 62 in FIG. 5 furnishes dibit and serial clock signals as shown on line (A) and (B) of FIG. 9. These signals are derived from a common source and are already available in the basic data receiver. In addition sample and transition pulses as shown on line (C) and (D) of FIG. 9 are derived from the respective negative and positive transitions of the debit clock wave. The sample pulses occur at the center of the dibit intervals.

The representative serial data train on line (E) of FIG. 9 has been differentially encoded on a carrier wave. This carrier wave is received on input line 25 and demodulated in receiver 50 in two parallel signal trains shown on lines (F) and (G) of FIG. 9. Successive dibit intervals are numbered from 1 to 16 for reference purposes. Errors are indicated in dibit positions 3 and 8 by broken lines, which are in fact the correct demodulation conditions. The error in position 3 occurs in the first bit of the dibit pair and the error in position 8 in the second bit. The signaling trains of lines (F) and (G) are delayed by one-dibit interval to show the AB signaling trains on lines (H) and (I). The E, F alternate dibit signaling trains developed in demodulators 72 and 73 are similarly shown on lines (J) and (K). Common timing is applicable to all six signaling trains, which are thus simultaneously and continuously available to error detection unit 68. The latter unit produces T pulses whenever the validity check fails in accordance with FIG. 4.

Validity fails in position 3 of the C, D wave because the C sample has been incorrectly demodulated as a 1 signal. None of Equations 9 through 12 produces a 1 output. Therefore, the 0 output of OR-gate 74 is inverted to a 1 signal in inverter 96 and is conducted through AND-gate 75 on the next sample pulse from clock 62 to initiate the operation of two-pulse counter 76. The search window is opened therein as previously described. The T pulses are shown on line (L) of FIG. 9. Validity is checked again in signaling interval 4 and fails because the A bit is in error. A second T pulse is generated and an error pulse occurs as is shown on line (Q) of FIG. 9. The error pulse enables error correction unit 71, which computes from the C, D, E and F signaling trains at position 4 that the A, B bits in position 3 should have been 0, 1. The correction unit therefore marks its $A_{clear}$ and $B_{set}$ outputs in accordance with Equations 14 and 15. Reference to FIG. 4 indicates that for CD and EF dibits 11, the AB dibit must be 01.

The raw data train on lead 61 has been stored in serial form in shift register stages 78 and 80. The incorrect A bit lies in stage 80 and the B bit in stage 78. These serial trains are shown on lines (S) and (T) of FIG. 9. The left-hand error pulse on line (Q) resets the A bit in position 3, which had been shifted from stage 78 in the set state, before the sampling instant at the center of the bit, as indicated on line (T) of FIG. 9. The arrowed broken line between the error pulse on line (Q) and the data stream on line (T) shows this relationship.

The right-hand bit of the demodulated signaling train in the eighth dibit position on line (G) of FIG. 9 is further assumed to be in error. The same error occurs in the next signaling interval as shown on line (I) of FIG. 9 in position 8. The bit demodulated as a 1 signal should have been a 0 signal. Two T pulses are generated in successive signaling intervals as shown on line (L) of FIG. 9, and cause an error pulse in position 9 as shown on line (Q). Error correction unit 71 computes from CD equals 11 and EF equals 01 that AB should have been 00. Accordingly, it marks the $A_{clear}$ and $B_{clear}$ output leads. The A bit stored in shift register stage 80 is correct and no change occurs. The B bit, which has just been demodulated as a 1 signal, is reset to a 0 signal before the sampling instant in stage 78. An arrowed broken line between the right-hand error pulse on line (Q) and the data stream on line (S) shows this relationship. In all other signaling intervals the data has been properly demodulated. The data stream in stage 80 is shifted through final stage 82 under the control of the inverted serial clock work as shown on line (U) of FIG. 9. The data stream on line (U) matches the original data on line (E).

The A bit in position 3 and the B bit in position 8 were demodulated in error, but the errors have been corrected in shift register stages 78 and 80 before delivery through shift register stage 82 to output lead 83. There has been no redundancy in the transmittal signal. The output has been delayed by only a one and a half dibit period. The overall error rate on tested toll telephone connections has been found to be on the order of ten to one.

The embodiment described in detail above is intended for illustrative purposes only as applied to the correction of single errors. It is well within the skill of the art to modify the described implementation and to enlarge on the principle of the invention to correct multiple errors by making comparisons between adjacent and nonadjacent phase differences extending over more than two dibit signaling intervals without departing from the spirit and scope thereof.

What is claimed is:

1. Apparatus for detecting errors in a synchronous differentially encoded phase-modulation data transmission system comprising first means determining the differences in phase between successive pairs of adjacent signaling intervals, second means determining the difference in phase between alternate signaling intervals bridging two successive pairs of adjacent signaling intervals, and means comparing the difference in phase from said second means with the sum of two successive differences in phase from said first means to generate error signals upon the failure of such comparison.

2. Apparatus in accordance with claim 1 in which discrete phase differences encode pairs of binary digits, said first means demodulates pairs of binary digits corresponding to phase differences between adjacent signaling intervals, said second means demodulates pairs of binary digits corresponding to phase differences between alternate signaling intervals, and said comparing means logically combines two successive pairs of binary digits from said first means with one pair of binary digits from said second means to test for the presence of error.

3. Apparatus for correcting errors in a synchronous differentially encoded phase-modulation data transmission system comprising means comparing the sum of the phase differences between successive pairs of adjacent signaling intervals with the phase difference between pairs of alternate signaling intervals to determine the presence of errors, means monitoring said comparing means to produce an error signal on the manifestation of errors in two successive signaling intervals, and means under the control of said error signal computing from the difference between the most recent alternate and one of said adjacent phase differences the correct phase difference of the other of said adjacent phase differences.

4. The apparatus of claim 3 in which said comparing means demodulates the pairs of binary digits corresponding to said adjacent and alternate phase differences, and said computing means logically combines an alternate pair of digits with an adjacent pair of digits to reconstruct a prior adjacent pair in error.

5. An error detection and correction arrangement for a differentially encoded phase-modulation data transmission system comprising first means taking the phase difference between adjacent signaling intervals, second means taking the phase difference between nonadjacent signaling intervals, means comparing the sum of phase differences obtained by said first taking means in successive signaling intervals with the phase difference obtained by said second taking means in nonadjacent signaling intervals bridging said successive signaling intervals and generating an error pulse on failure of such comparison, means responsive to said error pulses generating an error control signal upon counting a predetermined number of successive error pulses, said pedetermined number being the number of signaling intervals bridged by said second means, correcting means triggered by said error control signal subtracting the most recent adjacent phase difference obtained in said first means from the most recent alternate phase difference obtained in said second means to generate the correct adjacent phase difference for a previous signaling interval and thereby correcting signaling errors.

6. The error detection and correction arrangement of claim 5 in which said first means demodulates pairs of binary digits encoded by the phase differences between adjacent signaling intervals, said second means demodulates pairs of binary digits encoded by the phase differences between nonadjacent signaling intervals, said comparing means makes a logical validity check among pairs of digits demodulated by said first means and pairs of digits demodulated by said second means to generate said error pulses, and said correcting means generates the correct pair of binary digits for a prior signaling interval in error by logically combining a pair of digits obtained from said second means with one or more pairs of digits from said first means.

7. The error detection and correction arrangement of claim 5 in which said second means takes the phase difference between alternate signaling intervals, and said generating means counts the predetermined number two.

8. An error detection and correction arrangement for differentially encoded phase-shift data signals comprising first means demodulating adjacent pairs of phase-encoded data bits, second means demodulating alternate pairs of phase-encoded data bits, means detecting errors by comparing two successive pairs of data bits from said first demodulating means with a corresponding pair of data bits from said second demodulating means, the output of said detecting means indicating an error if known valid combinations of the several pairs of data bits fail to occur, and correction means jointly responsive to the occurrence of two successive error outputs from said detecting means and said first and second demodulating means to reconstruct the adjacent pair of data bits that would have been demodulated by said first demodulating means at the instant of the prior error output by the logical combination of the alternate and adjacent pairs of data bits demodulated at the instant of the most recent error output to render such combination valid.

9. The error detection and correction arrangement of claim 8 in which said first demodulating means operates on the difference between the absolute phase received in the present signaling interval and the absolute phase received in the immediately preceding signaling interval delayed by such signaling interval, said second demodulating means operates on the difference between the absolute phase received in the present signaling interval and the absolute phase received two signaling intervals prior to the present interval and delayed by two such signaling intervals, said detecting means operates on the pairs of data bits demodulated respectively by said first demodulating means in the present signaling interval and in the immediately preceding signaling interval delayed by one such signaling interval and by said second demodulating means in the present signaling interval, and said correction means operates on the pairs of data bits demodulated by said first and second demodulating means respectively in the present signaling interval to reconstruct the pair of data bits that should have been received in the immediately preceding signaling interval.

References Cited

Porter, G. C., et al.: Data at Twice the Speed Eases H-F Traffic Jam, in Electronics, pp. 115–120, Oct. 2, 1967.

MALCOLM A. MORRISON, Primary Examiner

R. S. DILDINE, Jr., Assistant Examiner

U.S. Cl. X.R.

178—67; 325—476